(12) United States Patent
Chang et al.

(10) Patent No.: US 12,287,496 B2
(45) Date of Patent: Apr. 29, 2025

(54) SYSTEM FOR GENERATING FLOATING IMAGE DISPLAY

(71) Applicant: GM Global Technology Operations LLC, Detroit, MI (US)

(72) Inventors: Kai-Han Chang, Sterling Heights, MI (US); Manoj Sharma, Troy, MI (US); Thomas A. Seder, Fraser, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 609 days.

(21) Appl. No.: 17/746,243

(22) Filed: May 17, 2022

(65) Prior Publication Data
US 2023/0375852 A1 Nov. 23, 2023

(51) Int. Cl.
| | |
|---|---|
| *G02B 30/56* | (2020.01) |
| *G02B 27/00* | (2006.01) |
| *G02B 27/10* | (2006.01) |
| *B60R 11/00* | (2006.01) |
| *B60R 11/02* | (2006.01) |

(52) U.S. Cl.
CPC ......... *G02B 30/56* (2020.01); *G02B 27/0093* (2013.01); *G02B 27/1006* (2013.01); *B60R 2011/0028* (2013.01); *B60R 2011/0029* (2013.01); *B60R 11/0235* (2013.01)

(58) Field of Classification Search
None
See application file for complete search history.

(56) References Cited

U.S. PATENT DOCUMENTS

| | | | |
|---|---|---|---|
| 2010/0046050 A1 | 2/2010 | Kroll et al. | |
| 2017/0322513 A1* | 11/2017 | Zapanta | G02B 5/32 |
| 2018/0147985 A1* | 5/2018 | Brown | G03B 17/54 |
| 2019/0243151 A1 | 8/2019 | Hansen | |
| 2021/0023948 A1* | 1/2021 | Knittl | G03B 21/10 |
| 2023/0039608 A1 | 2/2023 | Ji et al. | |
| 2023/0375829 A1 | 11/2023 | Seder et al. | |

* cited by examiner

*Primary Examiner* — Robert E. Tallman
(74) *Attorney, Agent, or Firm* — Vivacqua Crane, PLLC

(57) ABSTRACT

A system for generating a centrally located floating image display for a plurality of passengers positioned within a vehicle includes a plurality of displays adapted to project a graphic light image, a plurality of beam splitters, one beam splitter individually associated with each one of the plurality of displays, each beam splitter adapted to receive a graphic light image from the associated one of the plurality of displays and to reflect the graphic light image to one of the plurality of passengers, wherein, each of the plurality of passengers perceives a floating image at a central location within the vehicle.

20 Claims, 3 Drawing Sheets

SYSTEM FOR GENERATING FLOATING IMAGE DISPLAY

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing.

While current systems achieve their intended purpose, there is a need for a new and improved system for providing a floating image that appears centrally located within the vehicle to all the passengers within the vehicle.

SUMMARY

According to several aspects, a system for generating a centrally located floating image display for a plurality of passengers positioned within a vehicle includes a plurality of displays adapted to project a graphic light image, and a plurality of beam splitters, one beam splitter individually associated with each one of the plurality of displays, each beam splitter adapted to receive a graphic light image from the associated one of the plurality of displays and to reflect the graphic light image to one of the plurality of passengers, wherein, each of the plurality of passengers perceives a floating image at a central location within the vehicle.

According to another aspect, each of the plurality of displays is one of a liquid crystal display, an organic light-emitting diode, a holographic display and a light field display.

According to another aspect, each of the plurality of displays is adapted to project a three-dimensional image with variable virtual image distance.

According to another aspect, each of the plurality of displays is mounted to a roof within the vehicle.

According to another aspect, each of the plurality of displays is mounted within a floor within the vehicle.

According to another aspect, each of the plurality of beam splitters is transparent, wherein a passenger can see through the beam splitter.

According to another aspect, each of the plurality of beam splitters is moveable between a retracted position and an extended position.

According to another aspect, each of the plurality of beam splitters hangs from a roof of the vehicle.

According to another aspect, each of the plurality of beam splitters is supported from a floor of the vehicle.

According to another aspect, each of the plurality of beam splitters is supported from an armrest within the vehicle.

According to another aspect, each of the plurality of beam splitters is fixed.

According to another aspect, an orientation of each of the plurality of beam splitters is adjustable.

According to another aspect, each of the plurality of beam splitters is equipped with head tracking capability, wherein an orientation of each of the plurality of beam splitters changes automatically in response to movement of a head of a passenger.

According to another aspect, each of the plurality of displays is adapted to provide the same image to each of the plurality of beam splitters, wherein each passenger within the vehicle perceives the same floating image.

According to another aspect, each of the plurality of displays is adapted to provide a different image to each of the plurality of beam splitters, wherein each passenger within the vehicle perceives a different floating image.

According to another aspect, each of the plurality of beam splitters has a flat profile.

According to another aspect, each of the plurality of beam splitters has a curved profile.

According to several aspects of the present disclosure, a system for generating a centrally located floating image display for a plurality of passengers positioned within a vehicle includes a plurality of displays adapted to project a graphic light image, each of the plurality of displays one of a liquid crystal display, an organic light-emitting diode, a holographic display and a light field display and being mounted to one of a roof within the vehicle and within a floor of the vehicle, and a plurality of transparent beam splitters, one beam splitter individually associated with each one of the plurality of displays and having one of a flat profile and a curved profile, each of the plurality of beam splitters mounted within the vehicle by one of hanging from a roof of the vehicle, supported from a floor of the vehicle, and supported from an armrest within the vehicle, and each of the plurality of beam splitters moveable between a retracted position and an extended position, wherein, when in the extended position each of the plurality of beam splitters is adapted to receive a graphic light image from the associated one of the plurality of displays and to reflect the graphic light image to one of the plurality of passengers, wherein, each of the plurality of passengers perceives a floating image at a central location within the vehicle, an orientation of each of the plurality of beam splitters being one of fixed and adjustable, and each of the plurality of displays adapted to provide one of the same image to each of the plurality of beam splitters, wherein each passenger within the vehicle perceives the same floating image, and a different image to each of the plurality of beam splitters, wherein each passenger within the vehicle perceives a different floating image.

According to another aspect, each of the plurality of displays is adapted to project a three-dimensional image with variable virtual image distance.

According to another aspect, an orientation of each of the plurality of beam splitters is adjustable and each of the plurality of beam splitters is equipped with head tracking capability, wherein the orientation of each of the plurality of beam splitters changes automatically in response to movement of a head of a passenger.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
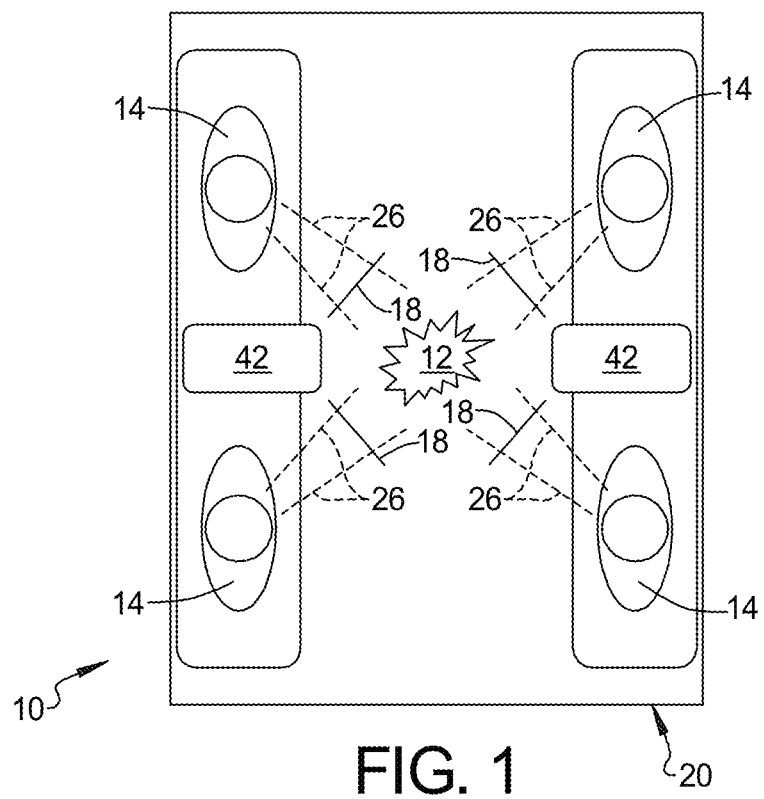
FIG. 1 is a schematic top view of a vehicle compartment having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 2:
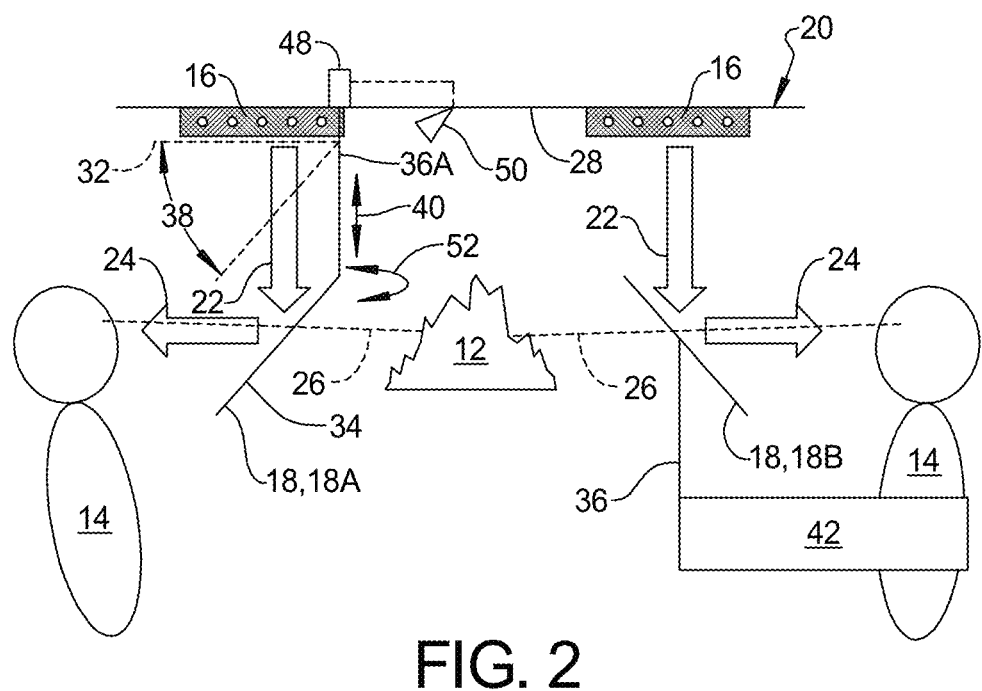
FIG. 2 is a schematic side view of two passengers within a vehicle compartment having a system according to an exemplary embodiment, wherein each of the displays is mounted onto a roof of the vehicle compartment.

Referring to FIG. 1 and FIG. 2, a system 10 for generating a centrally located floating image 12 display for a plurality of passengers 14 positioned within a vehicle, includes a plurality of displays 16 that are adapted to project a graphic light image and a plurality of beam splitters 18, one beam splitter 18 individually associated with each one of the plurality of displays 16.

Referring to FIG. 1, in an exemplary embodiment, a vehicle compartment 20 includes a plurality of seating positions occupied by a plurality of passengers 14. Each beam splitter 18 is adapted to be viewed by one of the passengers 14. Referring to FIG. 2, each of the plurality of displays 16 is adapted to project a graphic light image to one of the plurality of beam splitters 18, as indicated by arrow 22. Each of the plurality of beam splitters 18 is adapted to receive the graphic light image from the associated one of the plurality of displays 16 and to reflect the graphic light image to one of the plurality of passengers 14, as indicated by arrow 24. The passenger 14 perceives the floating image 12 at a location centrally located relative to all of the passengers 14, as indicated by lines 26.

In an exemplary embodiment, each of the plurality of displays 16 is one of a liquid crystal display, an organic light-emitting diode, a holographic display and a light field display. It should be understood that other types of displays could be incorporated without departing from the scope of the present disclosure. In one exemplary embodiment, each of the plurality of displays 16 is adapted to project a three-dimensional image with variable virtual image distance. This is possible when the displays 16 are holographic or light field displays. Three-dimensional images with variable virtual image distance allows the system to project a floating image 12 to the passenger 14 with the capability of making the floating image 12 appear closer or further away from the passenger 14.

Referring to FIG. 2, in an exemplary embodiment, each of the plurality of displays 16 is mounted to a roof 28 within the vehicle compartment 20. Alternatively, referring to FIG. 3, in another exemplary embodiment, each of the plurality of displays 16 is mounted within a floor 30 within the vehicle compartment 20. The displays 16 may be mounted directed onto the floor 30 surface of the vehicle compartment 20, or the displays 16 may be recessed within the floor 30.

Figure 3:
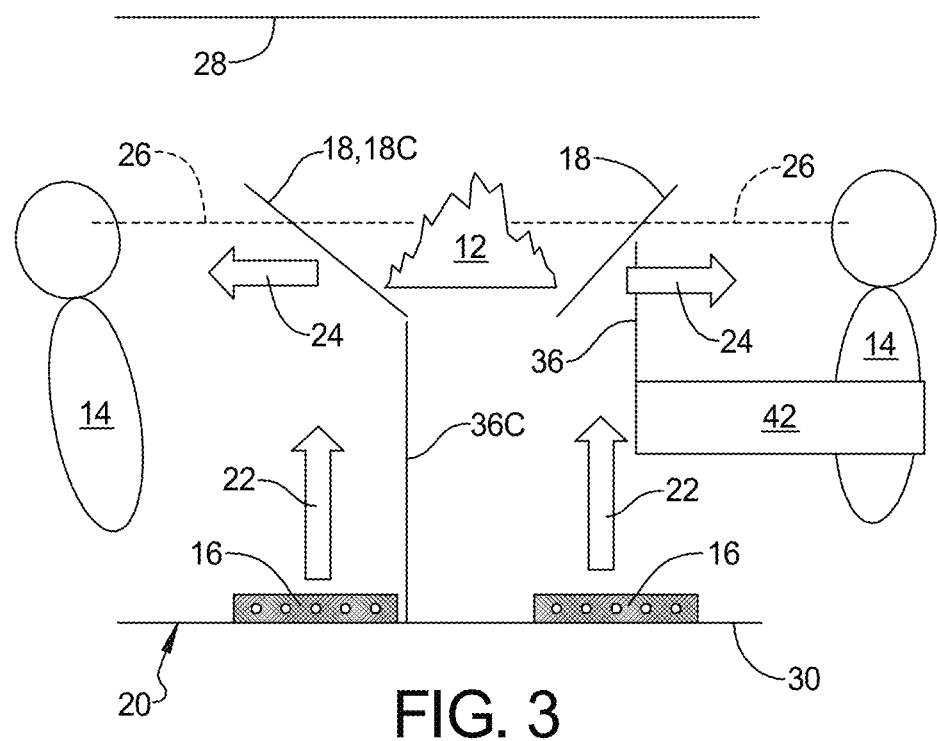
FIG. 3 is a schematic side view of two passengers within a vehicle compartment having a system according to an exemplary embodiment, wherein each of the displays is mounted onto a floor of the vehicle compartment.

Referring to FIG. 2 and FIG. 3, each of the plurality of beam splitters 18 is transparent, wherein a passenger 14 can see through the beam splitter, as indicated at 26. This allows the passenger 14 to perceive the floating image 12 at a distance beyond the beam splitter 18 and further, allows the passenger 14 to see through the beam splitter 18 and able to see the interior of the vehicle compartment 20 and other passengers 14 therein.

Referring to FIG. 2, a beam splitter 18A is shown, wherein the beam splitter 18A is moveable between a retracted position 32 and an extended position 34. In an exemplary embodiment, the beam splitter 18A is mounted onto a support shaft 36A that hangs down from the roof 28 of the vehicle compartment 20. In the retracted position 32, the beam splitter 18A is positioned adjacent to the display 16 and parallel to the roof 28 of the vehicle compartment 20. The beam splitter 18A is pivotal relative to the support shaft 36A, as indicated by arrow 38, and the support shaft 36 is extendable vertically up and down, as indicated by arrow 40. From the retracted position 32, the beam splitter 18A is pivoted down, and the support shaft 36A is extended downward to place the beam splitter 18A in the extended position 34 for use. When in the extended position 34, the beam splitter 18A is in operation proximity to the display 16 and the passenger 14.

Referring again to FIG. 2, a beam splitter 18B is shown, wherein the beam splitter 18B is mounted onto an armrest 42 next to the passenger 14. The beam splitter 18B is attached to a support shaft 36B that is attached to the armrest 42. While not shown, the beam splitter 18B supported on the armrest 42 may also be moveable from a retracted position to an extended position. In one exemplary embodiment, the beam splitter 18B is stowed within the armrest 42 when in the retracted position.

Referring again to FIG. 3, a beam splitter 18C is shown, wherein the beam splitter 18C is mounted onto a support shaft 36C extending upward from the floor 30 of the vehicle compartment 20. While not shown, the beam splitter 18C supported from the floor 30 of the vehicle compartment 20 may also be moveable from a retracted position to an extended position. In one exemplary embodiment, the beam splitter 18C is stowed within the floor 30 of the vehicle compartment 20 when in the retracted position.

Figure 4:
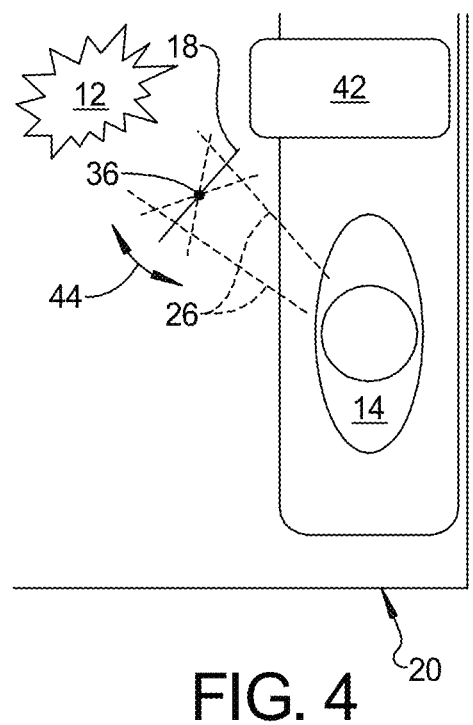
FIG. 4 is a schematic top view of a portion of a vehicle compartment including a beam splitter that is horizontally pivotal.
Figure 5:
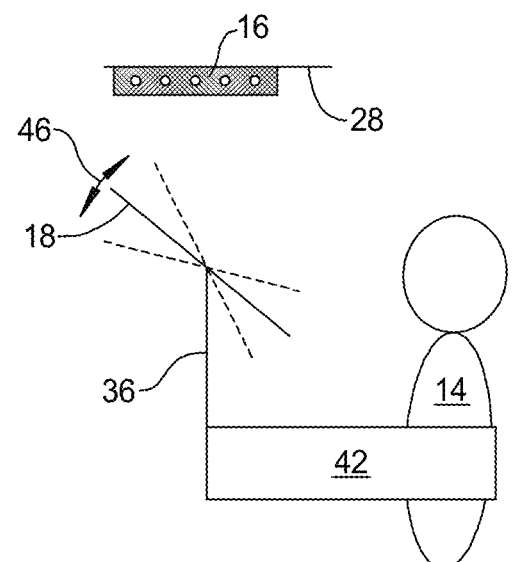
FIG. 5 is a schematic side view of a portion of a vehicle compartment including a beam splitter that is vertically pivotal.

In an exemplary embodiment, an orientation of each of the plurality of beam splitters 18 is fixed. Thus, when the beam splitters 18 are in the extended position 34 angular orientation vertically and horizontally relative to the support shaft 36A, 36B, 36C is fixed. Alternatively, in another exemplary embodiment, an orientation of each of the plurality of beam splitters 18 is adjustable. Referring to FIG. 4, the beam splitter 18 is pivotally mounted onto the support shaft 36 wherein the beam splitter 18 is pivotal horizontally about an axis as shown by arrow 44. Referring to FIG. 5, the beam splitter 18 is pivotally mounted onto the support shaft 36 wherein the beam splitter 18 is vertically pivotal, as indicated by arrow 46. Adjustability of the beam splitter 18 allows the beam splitter 18 to be positioned according to the position of the passenger 14 within the vehicle compartment 20, and according to the height of the passenger 14, ensuring that the system 10 can be customized to accommodate passengers of different size and seating position/orientation preferences. In addition, adjustability of the orientation of the beam splitter 18 allows the perceived location of the floating image 12 to be adjusted according to the passenger's preferences.

In an exemplary embodiment, each of the plurality of beam splitters 18 is equipped with head tracking capability, wherein an orientation of each of the plurality of beam splitters 18 changes automatically in response to movement of a head of a passenger 14. Referring to FIG. 2, the support shaft 36A is attached to a pivotal motor 48 in communication with a driver monitoring system within the vehicle. Driver monitoring systems within a vehicle include cameras that monitor head and eye movement of a driver/passenger within the vehicle. A camera 50 of a driver/passenger monitoring system is mounted within the vehicle compartment 20 and adapted to monitor head and eye movement of the passenger 14. The motor 48 receives information from the camera 50 and in response to detection of head/eye movement by the passenger 14, pivots the support shaft 36A, and the beam splitter 18A, as indicated by arrow 52, to change the orientation of the beam splitter 18A, as indicated by arrow 44 in FIG. 4. Likewise, a motor may be adapted to pivotally change the orientation of the beam splitter 18, as shown in FIG. 5, wherein the motor receives information from the camera 50 of a driver/passenger monitoring system, and in response to detection of head/eye movement by the passenger 14, pivots the beam splitter 18, as indicated by arrow 46 in FIG. 5.

In an exemplary embodiment, each of the plurality of displays 16 is adapted to provide the same image to each of the plurality of beam splitters 18, wherein each passenger 14 within the vehicle compartment 20 perceives the same floating image 12. This allows the system 10 to present the same floating image 12 to all the passengers 14 so they can view simultaneously. In another exemplary embodiment, each of the plurality of displays 16 is adapted to provide a different floating image 12 to each of the plurality of beam splitters 18, wherein each passenger 14 within the vehicle compartment 20 perceives a different floating image 12. This allows the system 10 to present different floating images 12, or different perspectives of the same floating image 12 to each of the passengers 14 within the vehicle compartment 20.

Figure 6:
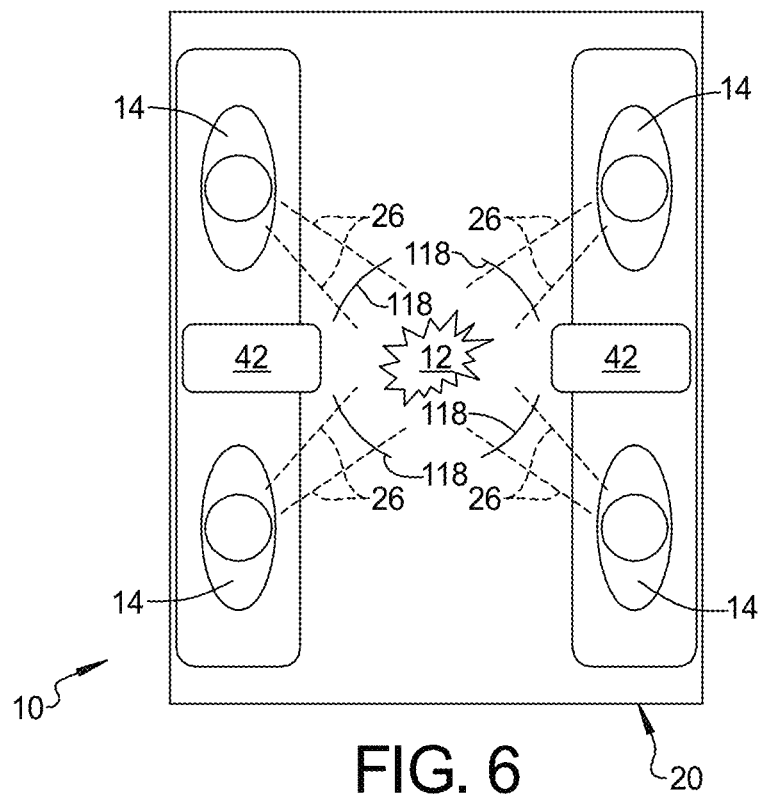
FIG. 6 is a schematic top view of a vehicle compartment having a system in accordance with an exemplary embodiment of the present disclosure, wherein the beam splitters have a curved profile.

Referring again to FIG. 1, in an exemplary embodiment the beam splitters 18 have a flat profile. Referring to FIG. 6, in another exemplary embodiment, each of the plurality of beam splitters 118 has a curved profile. Depending on the nature of the plurality of displays 16, and the desired characteristics of the floating image 12, beam splitters 18 having a flat profile or beam splitters 118 having a curved profile can be utilized. Further, the curvature of a curved beam splitter 118 can be varied to further adjust the characteristics of the displayed floating image 12.

A system of the present disclosure offers several advantages. These include providing a floating image that is perceived by the passengers at a centrally location position within the vehicle compartment. This provides a camp-fire like viewing atmosphere where the passengers can all view a common floating image, or each passenger can view a unique floating image.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a centrally located floating image display for a plurality of passengers positioned within a vehicle, comprising:
    a plurality of displays adapted to project a graphic light image; and
    a plurality of beam splitters, one beam splitter individually associated with each one of the plurality of displays;
    each beam splitter adapted to receive a graphic light image from the associated one of the plurality of displays and to reflect the graphic light image to one of the plurality of passengers, wherein, each of the plurality of passengers perceives a floating image at a central location within the vehicle.

2. The system of claim 1, wherein each of the plurality of displays is one of a liquid crystal display, an organic light-emitting diode, a holographic display and a light field display.

3. The system of claim 2, wherein each of the plurality of displays is adapted to project a three-dimensional image with variable virtual image distance.

4. The system of claim 1, wherein each of the plurality of displays is mounted to a roof within the vehicle.

5. The system of claim 1, wherein each of the plurality of displays is mounted within a floor within the vehicle.

6. The system of claim 1, wherein each of the plurality of beam splitters is transparent, wherein a passenger can see through the beam splitter.

7. The system of claim 1, wherein each of the plurality of beam splitters is moveable between a retracted position and an extended position.

8. The system of claim 1, wherein each of the plurality of beam splitters hangs from a roof of the vehicle.

9. The system of claim 1, wherein each of the plurality of beam splitters is supported from a floor of the vehicle.

10. The system of claim 1, wherein each of the plurality of beam splitters is supported from an armrest within the vehicle.

11. The system of claim 1, wherein an orientation of each of the plurality of beam splitters is fixed.

12. The system of claim 1, wherein an orientation of each of the plurality of beam splitters is adjustable.

13. The system of claim 1, wherein each of the plurality of beam splitters is equipped with head tracking capability, wherein an orientation of each of the plurality of beam splitters changes automatically in response to movement of a head of a passenger.

14. The system of claim 1, wherein each of the plurality of displays is adapted to provide the same image to each of the plurality of beam splitters, wherein each passenger within the vehicle perceives the same floating image.

15. The system of claim 1, wherein each of the plurality of displays is adapted to provide a different image to each of the plurality of beam splitters, wherein each passenger within the vehicle perceives a different floating image.

16. The system of claim 1, wherein each of the plurality of beam splitters has a flat profile.

17. The system of claim 1, wherein each of the plurality of beam splitters has a curved profile.

18. A system for generating a centrally located floating image display for a plurality of passengers positioned within a vehicle, comprising:
- a plurality of displays adapted to project a graphic light image, each of the plurality of displays one of a liquid crystal display, an organic light-emitting diode, a holographic display and a light field display and being mounted to one of a roof within the vehicle and within a floor of the vehicle; and
- a plurality of transparent beam splitters, one beam splitter individually associated with each one of the plurality of displays and having one of a flat profile and a curved profile;
- each of the plurality of beam splitters mounted within the vehicle by one of hanging from a roof of the vehicle, supported from a floor of the vehicle, and supported from an armrest within the vehicle, and each of the plurality of beam splitters moveable between a retracted position and an extended position, wherein, when in the extended position each of the plurality of beam splitters is adapted to receive a graphic light image from the associated one of the plurality of displays and to reflect the graphic light image to one of the plurality of passengers, wherein, each of the plurality of passengers perceives a floating image at a central location within the vehicle, an orientation of each of the plurality of beam splitters being one of fixed and adjustable; and
- each of the plurality of displays adapted to provide one of the same image to each of the plurality of beam splitters, wherein each passenger within the vehicle perceives the same floating image, and a different image to each of the plurality of beam splitters, wherein each passenger within the vehicle perceives a different floating image.

19. The system of claim 18, wherein each of the plurality of displays is adapted to project a three-dimensional image with variable virtual image distance.

20. The system of claim 18, wherein the orientation of each of the plurality of beam splitters is adjustable and each of the plurality of beam splitters is equipped with head tracking capability, wherein the orientation of each of the plurality of beam splitters changes automatically in response to movement of a head of a passenger.

* * * * *